(12) United States Patent
Birk et al.

(10) Patent No.: US 7,083,023 B2
(45) Date of Patent: Aug. 1, 2006

(54) ACTUATING DEVICE FOR A SAFETY MEANS

(75) Inventors: Karl Birk, Ebersbach (DE); Uwe Class, Schechingen (DE); Reiner Dannenhauer, Welzheim (DE); Michael Lüders, Schechingen (DE); Thomas Miodek, Mutlangen (DE); Thomas Hasbach, Köln (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 8 days.

(21) Appl. No.: 10/951,304

(22) Filed: Sep. 27, 2004

(65) Prior Publication Data

US 2005/0057022 A1 Mar. 17, 2005

Related U.S. Application Data

(62) Division of application No. 10/162,969, filed on Jun. 5, 2002, now Pat. No. 6,942,251.

(30) Foreign Application Priority Data

Jun. 18, 2001 (DE) .......................... 201 10 046 U
Sep. 28, 2001 (DE) ................................ 101 47 970

(51) Int. Cl.
*B60R 21/34* (2006.01)
(52) U.S. Cl. ............. 180/274; 296/187.04; 296/193.11
(58) Field of Classification Search ................. 180/274, 180/282; 296/187.04, 193.11; B60R 21/34
See application file for complete search history.

(56) References Cited

U.S. PATENT DOCUMENTS

| 2,483,088 | A | | 9/1949 | Dehaven |
| 2,880,815 | A | | 4/1959 | Apfelbaum |
| 3,292,744 | A | | 12/1966 | Replogle |
| 3,386,683 | A | | 6/1968 | Howland |
| 3,838,746 | A | | 10/1974 | Andres |
| 3,871,470 | A | | 3/1975 | Schwanz et al. |
| 3,901,531 | A | | 8/1975 | Prochazka |
| 3,942,819 | A | | 3/1976 | Schwanz et al. |
| 4,006,934 | A | | 2/1977 | Murakami et al. |
| 4,008,909 | A | | 2/1977 | Otani et al. |
| 4,015,860 | A | | 4/1977 | Tisell et al. |
| 4,249,632 | A | * | 2/1981 | Lucchini et al. ............ 180/274 |
| 4,767,161 | A | | 8/1988 | Sedlmayr et al. |
| 5,186,494 | A | | 2/1993 | Shimose |
| 5,322,322 | A | | 6/1994 | Bark et al. |
| 5,451,094 | A | | 9/1995 | Templin et al. |
| 5,464,246 | A | | 11/1995 | Castro et al. |
| 5,897,135 | A | | 4/1999 | Oehm |
| 5,924,722 | A | | 7/1999 | Koide et al. |
| 5,971,491 | A | | 10/1999 | Fourrey et al. |
| 6,152,481 | A | | 11/2000 | Webber et al. |
| 6,182,782 | B1 | * | 2/2001 | Matsuura et al. ........... 180/274 |
| 6,217,108 | B1 | * | 4/2001 | Sasaki .................... 296/187.09 |
| 6,322,140 | B1 | | 11/2001 | Jessup et al. |
| 6,329,910 | B1 | * | 12/2001 | Farrington .................. 340/436 |
| 6,336,653 | B1 | | 1/2002 | Yaniv et al. |
| 6,447,011 | B1 | | 9/2002 | Vollimer |

(Continued)

FOREIGN PATENT DOCUMENTS

DE 2543068 4/1976

(Continued)

*Primary Examiner*—Eric Culbreth
(74) *Attorney, Agent, or Firm*—Tarolli, Sundheim, Covell & Tummino LLP

(57) ABSTRACT

An actuating device for a safety arrangement in a vehicle has a pneumatic muscle as a drive and a pyrotechnical gas generator for feeding the pneumatic muscle.

1 Claim, 4 Drawing Sheets

U.S. PATENT DOCUMENTS

| | | |
|---|---|---|
| 6,565,121 B1 | 5/2003 | Knych et al. |
| 2003/0137140 A1 | 7/2003 | Lutz et al. |
| 2003/0155801 A1 | 8/2003 | Tatematsu et al. |

FOREIGN PATENT DOCUMENTS

| | | |
|---|---|---|
| DE | 4308571 | 9/1994 |
| DE | 19531097 | 2/1997 |
| DE | 19724628 | 1/1998 |
| DE | 19750182 | 5/1999 |
| DE | 10045328 | 5/2001 |
| DE | 10058932 | 5/2001 |
| DE | 19956304 | 5/2001 |
| DE | 10065464 | 8/2001 |
| DE | 20106056 | 9/2001 |
| DE | 10100876 | 4/2002 |
| DE | 010116716 A1 * | 10/2002 |
| EP | 0751304 | 1/1997 |
| EP | 0924122 | 6/1999 |
| EP | 1110808 | 6/2001 |
| EP | 001319561 A1 * | 6/2003 |
| FR | 2442058 | 6/1980 |
| JP | 2001247010 | 9/2001 |
| JP | 2001287622 | 10/2001 |

* cited by examiner

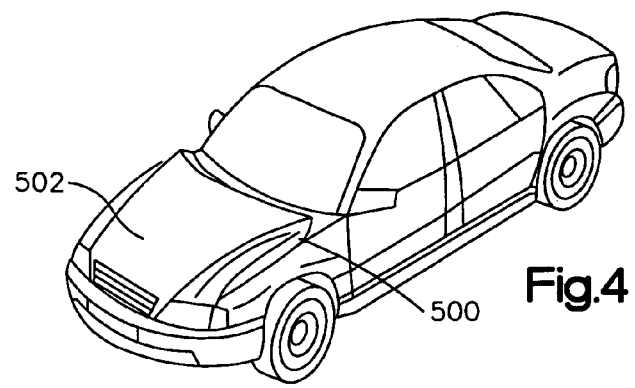
Fig.4
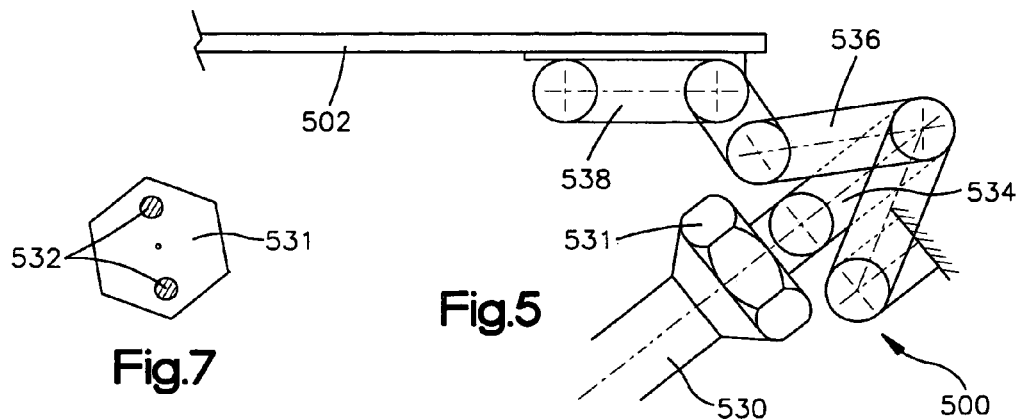
Fig.7
Fig.5
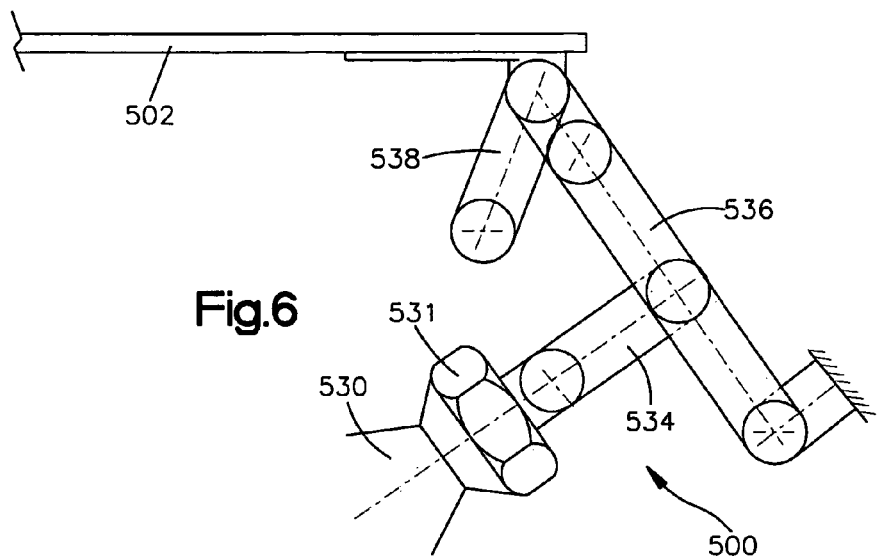
Fig.6

ACTUATING DEVICE FOR A SAFETY MEANS

CROSS-REFERENCE TO RELATED APPLICATIONS

This application is a divisional of U.S. patent application Ser. No. 10/162,969, filed Jun. 5, 2002, now U.S. Pat. No. 6,942,251 B2, which is assigned to the assignee of the present application.

TECHNICAL FIELD

This invention relates to an actuating device for a safety means in a vehicle, and an assembly consisting of a safety means and such actuating device.

BACKGROUND OF THE INVENTION

Such actuating devices have so far been designed as compressed-gas-operated piston-cylinder units or electric drives. Piston-cylinder drives are inflexible and mostly bulky, as they must have a linear travel path for the piston. An important prerequisite for the use for a safety means is the reaction time, i.e. how fast can the actuating device activate the protection means to such an extent that the protective effect is obtained. This is impeded by the mass inertia of moving parts. It is often attempted to compensate this obstacle by overdimensioning the drive, whereby space requirement and weight of the actuating device are increased.

The invention provides an actuating device requiring little space, which can flexibly be accommodated in the vehicle and has a very short reaction time.

BRIEF SUMMARY OF THE INVENTION

According to the invention, an actuating device is provided which has a pneumatic muscle as drive and a pyrotechnical gas generator for feeding the pneumatic muscle. Pneumatic muscle is understood here to be a fluid-operated actuating device, as it is described for instance in DE 195 31 097 A1. The pneumatic muscle consists of a tubular body, which is surrounded by a sleeve with a net-like structure. When the tubular body is pressurized, this leads to a radial expansion, which due to the net structure of the sleeve results in a longitudinal contraction of the muscle. In the case of activation, an actuating device with such pneumatic muscle can react very quickly, because in contrast to a piston-cylinder drive no piston mass has to be accelerated. Since the pyrotechnical gas generator can produce a sufficient amount of gas with the required pressure within fractions of a second, the safety means can be activated very quickly by the actuating device, so that in the case of an accident the protective effect can be produced in good time and effectively. In addition, the pneumatic muscle is flexible, so that the actuating device in the vehicle can be bent during installation and thus be mounted even at hardly accessible points and can also be laid in curved fashion.

Further advantageous aspects of the invention can be taken from the sub-claims.

BRIEF DESCRIPTION OF THE DRAWINGS

FIG. 4 shows in a schematic view a vehicle comprising an assembly according to another embodiment in the activated condition;

FIG. 5 shows in a schematic view the assembly according to the embodiment of FIG. 4 in the non-activated condition;

FIG. 6 shows the assembly of FIG. 5 in the activated condition; and

FIG. 7 shows in a schematic plan view a detail of the pneumatic muscle used with the embodiment of FIGS. 4 to 6.

DETAILED DESCRIPTION OF THE PREFERRED EMBODIMENTS

Figure 1A:
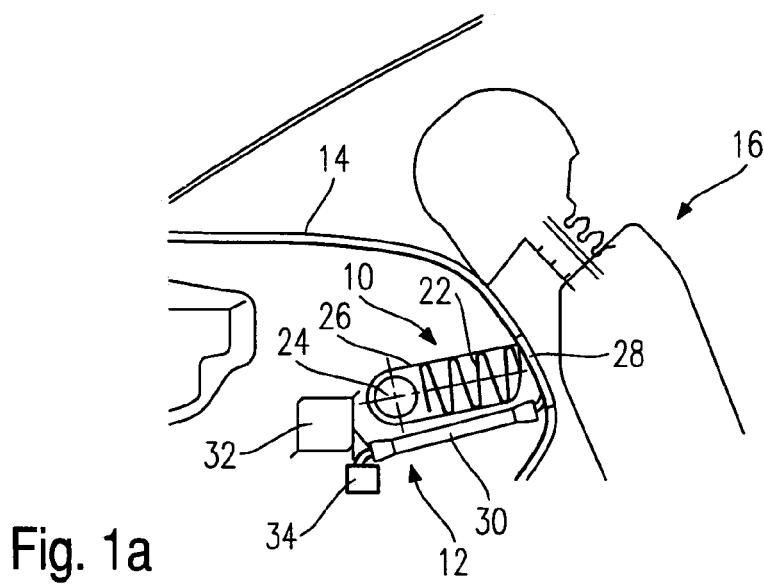
FIGS. 1a to 1e show a schematic cross-section through a first embodiment of an assembly according to the invention, in successive phases of an activation process, respectively.
Figure 1B:
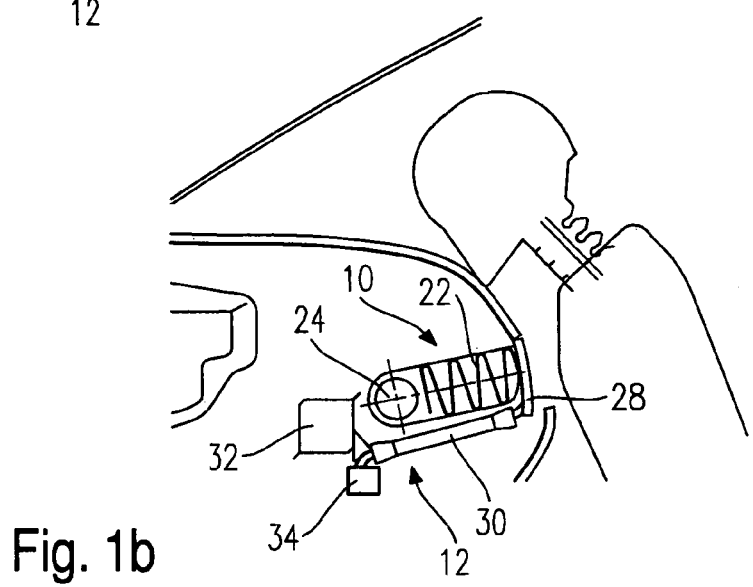
Figure 1C:
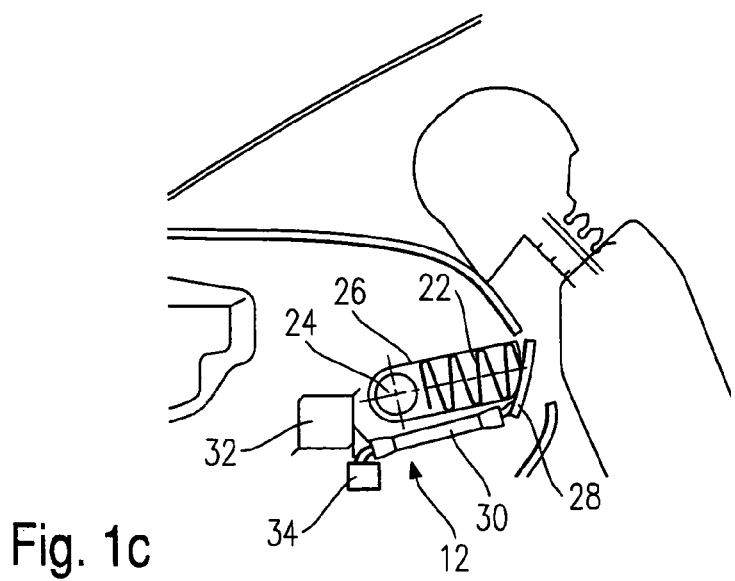
Figure 1D:
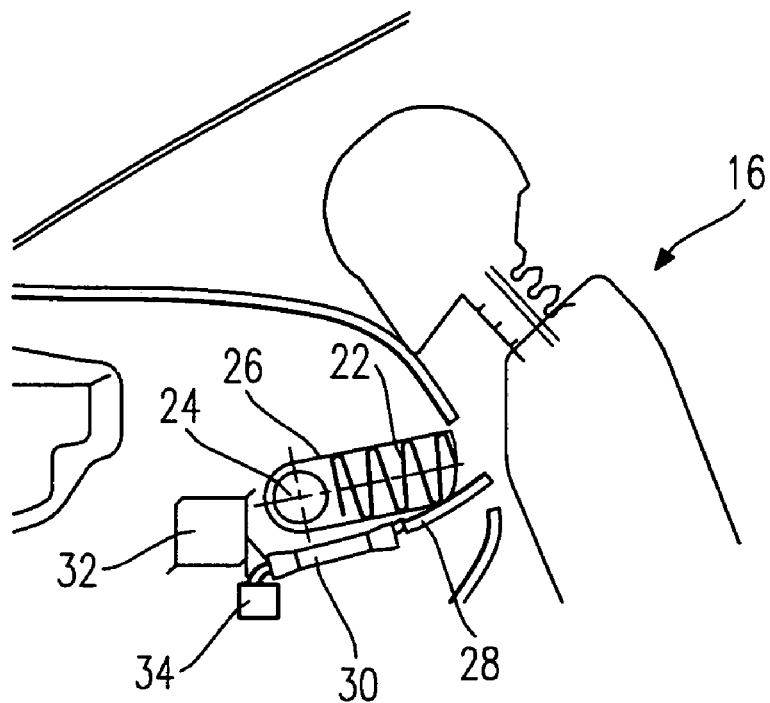
Figure 1E:
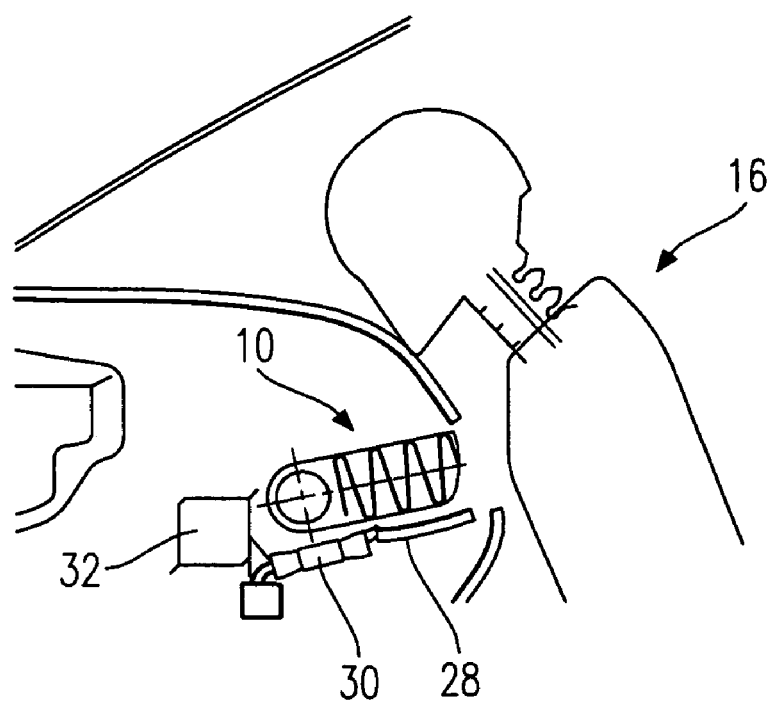

In FIGS. 1a to 1e there is to be seen an assembly according to the invention, comprising a safety means 10 and an actuating device 12, in successive phases of activation of the safety means 10. The assembly is incorporated in a dashboard 14 of a vehicle. In the Figures, the contours of the upper torso of a vehicle occupant 16 are represented schematically, which torso is bent forwards towards the dashboard 14. In the represented embodiment, the safety means 10 consists of a gas bag module with a folded gas bag 22 and a main gas generator 24, which are accommodated in a housing 26. The housing 26 has an opening which points towards the vehicle occupant 16 and is closed by a covering flap 28. In this arrangement, the covering flap 28 may exist in various designs, for instance integrated in the dashboard 14 as shown in the Figures, mounted on the dashboard as a separate cover, or as a component of the housing 26.

The actuating device 12 has a pneumatic muscle 30, one end of which may be attached to the covering flap 28 and the other end of which may for instance be attached to a frame member 32 of the vehicle or to the housing 26 of the gas bag module. A secondary gas generator 34 advantageously is disposed in the vicinity of the pneumatic muscle 30 and is in flow connection with the same.

For activating the safety means, the secondary gas generator 34 is ignited first of all, which in shortest time generates a gas volume that gets into the pneumatic muscle 30 and effects a longitudinal contraction of the same. Due to the longitudinal contraction of the pneumatic muscle 30, the covering flap 28 is drawn into the interior of the dashboard 14 (FIGS. 1b to 1e), in so doing it clearing the opening of the housing 26.

Subsequently, the main gas generator 24 can be ignited in order to inflate the gas bag 22. Since the opening of the housing 26 has now been cleared, less amount of gas is required for inflating the gas bag 22 than with comparable gas bag modules in which a covering flap must first be opened by the pressure of the deploying gas bag. As a result, the main gas generator 24 can be designed much smaller and lighter.

Figure 2:
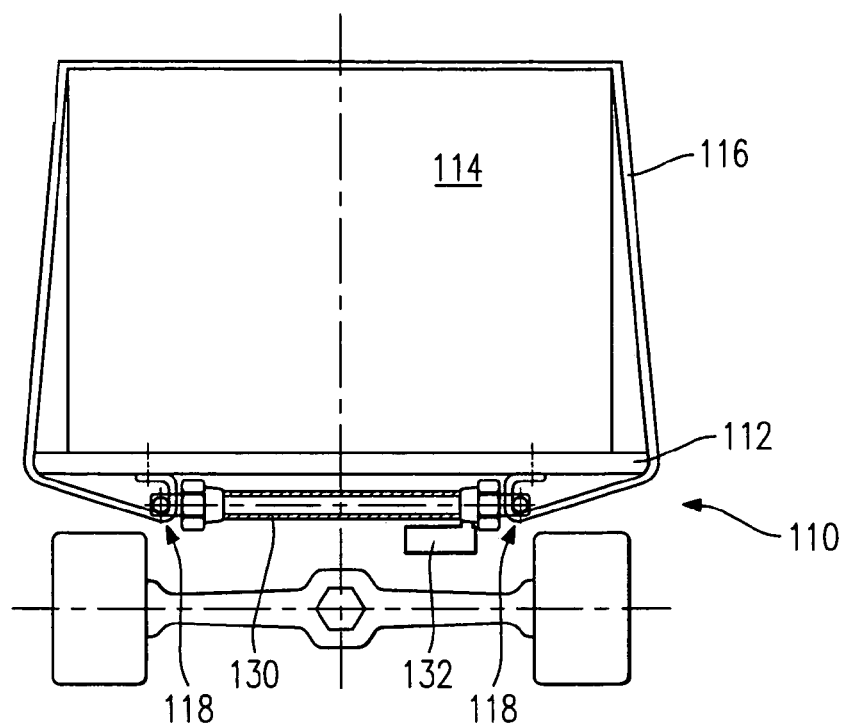
FIG. 2 shows a schematic cross-section through a vehicle with an assembly according to a second embodiment of the invention in the non-activated condition of the assembly.
Figure 3:
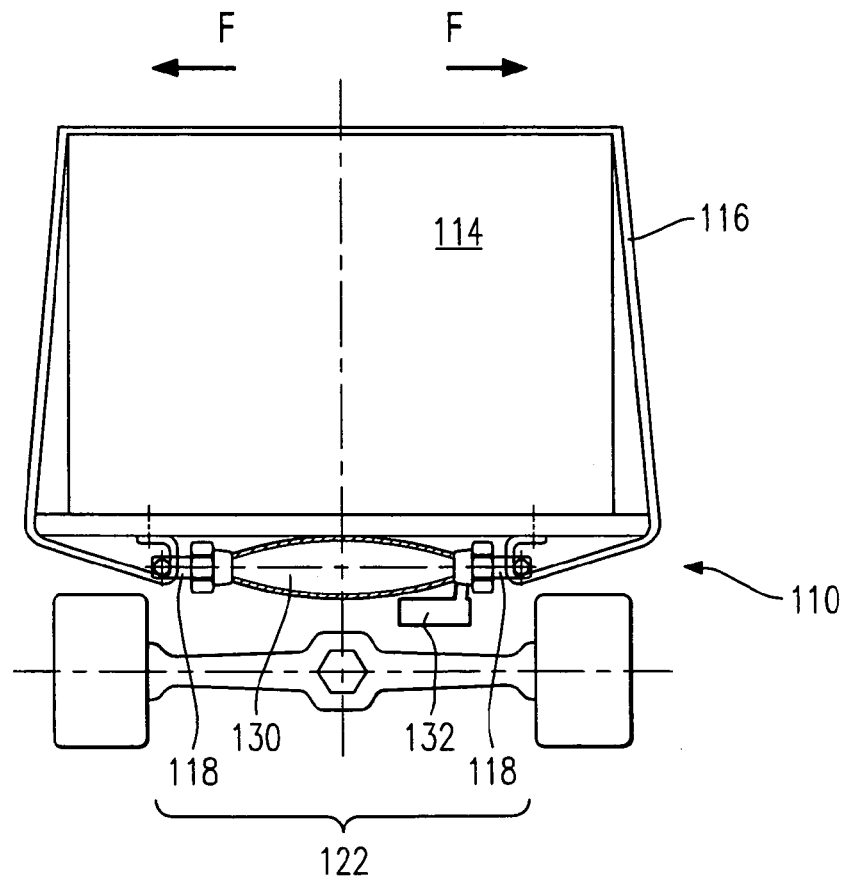
FIG. 3 shows a schematic cross-section through the vehicle of FIG. 2 in the activated condition of the assembly.

A second embodiment of the assembly according to the invention can be seen in FIGS. 2 and 3. On a schematically represented truck 110 with a loading area 112 a cargo 114 is disposed, which is secured with a tensioning belt 116. The two ends of the tensioning belt 116 are attached to the loading area 112 on the lower side thereof and are each passed through one of two eyes 118 of a tensioning device. For tensioning the tensioning belt 116, the two eyes 118 are movable parallel to the plane of the loading area 112. The tensioning device can be actuated by an actuating device 122 comprised of a pneumatic muscle 130 and a pyrotechnical gas generator 132. For this purpose, the ends of the pneumatic muscle 130 are each connected with one of the eyes 118. For activating the tensioning device, the pneumatic muscle 130 is pressurized so that it contracts in the known manner, thereby moving the eyes 118 towards each other such that the tensioning belt 116 is tensioned.

An additional mechanical lock can prevent that upon decrease in pressure in the pneumatic muscle 130 the tensioning device slackens again.

In the case of accidents or emergency stops, the tensioning device can for instance be activated by a sensor. In this way it can be prevented that the cargo 114 on the loading area 112 slips away.

It may, however, also be provided to actuate the tensioning device automatically or by manual activation at the end of the loading operation. The advantage is that when manually securing the cargo, less force must be applied. When the pressure existing in the pneumatic muscle during the tensioning operation is measured, the measured pressure value can be used as a criterion as to whether the cargo is secured sufficiently.

In general, a possibly existing compressed-air generator of the vehicle may also be utilized as pressure source for the pneumatic muscle, whereas the gas generator 132 is only ignited in the case of accidents or emergency stops.

The safety means described is suitable for instance for trucks and trailers, but also for railway vehicles.

In FIGS. 4 to 7 there is shown another assembly of a safety means for a vehicle. This assembly is an actuating device 500 for an engine hood 502 of a vehicle schematically shown in FIG. 4. The actuating device comprises a pneumatic muscle 530 the end of which that is not shown is fixedly mounted to the vehicle and the other end of which is provided with a tubing head 531. Arranged in the tubing head 531 are several gas generators 532 which can be ignited in order to guide pressurized gas into the interior of the pneumatic muscle.

The tubing head 531 is connected via a tie member 534 with a knee link 536 which is articulated on one side so as to be fixed to the vehicle and on the other side to the engine hood 502. There is further provided a support member 538 on the engine hood. When the pneumatic muscle 530 shortens, the engine hood 502 is transferred through the knee link 536 from the initial position shown in FIG. 5 into the raised position shown in FIG. 6. It is in this way that a larger deformation path can be made available for the case of a collision with pedestrians or bikers. Raising the engine hood may, for example, be effected after a determination of contact in the front car region.

Raising the engine hood is to be reversible. After activation of the actuating device 500, the engine hood again can be pressed downwards so that it reaches its initial position. As there are provided several gas generators 532, of which in the case of actuation only one single is ignited, the actuation device continues to be ready for operation after an activation. It is only the gas generator that has to be replaced at the first opportunity. This is possible with small expenditure without exchanging the entire pneumatic muscle.

From the above description of the invention, those skilled in the art will perceive improvements, changes and modifications. Such improvements, changes and modifications within the skill of the art are intended to be covered by the appended claims.

The invention claimed is:

1. An assembly comprising a safety apparatus and an actuating device, said actuating device comprising a drive and a pyrotechnic gas generator for, when actuated, actuating said drive, said safety apparatus including a raisable engine hood which can be transferred from an initial position into a raised position by said actuating device, said drive comprising a radially expandable, tubular body, said tubular body longitudinally contracting upon radial expansion of said tubular body to raise said engine hood.

* * * * *